(12) United States Patent
Dole et al.

(10) Patent No.: US 10,359,127 B2
(45) Date of Patent: Jul. 23, 2019

(54) ATTACHMENT OF A FLUID FLOW HAT FOR ACTUATED VALVE

(71) Applicants: Danfoss Power Solutions GmbH & Co. OHG, Neumunster (DE); Artemis Intelligent Power Ltd., Loanhead, Midlothian, Scotland (GB)

(72) Inventors: Alexis Dole, Scotland (GB); Jack Samuel Lavender, Scotland (GB); Fergus Robert McIntyre, Scotland (GB); Jens Dominik Willy Eilers, Scotland (GB)

(73) Assignees: Danfoss Power Solutions GmbH & Co. OHG, Neumunster (DE); Artemis Intelligent Power Ltd., Lonahead, Midlothian (GB)

( * ) Notice: Subject to any disclaimer, the term of this patent is extended or adjusted under 35 U.S.C. 154(b) by 6 days.

(21) Appl. No.: 14/890,957

(22) PCT Filed: May 14, 2014

(86) PCT No.: PCT/EP2014/059880
§ 371 (c)(1),
(2) Date: Nov. 13, 2015

(87) PCT Pub. No.: WO2014/191206
PCT Pub. Date: Dec. 4, 2014

(65) Prior Publication Data
US 2016/0084246 A1 Mar. 24, 2016

(30) Foreign Application Priority Data
May 31, 2013 (EP) .................................... 13170168

(51) Int. Cl.
*F15D 1/02* (2006.01)
*F16K 31/02* (2006.01)
(Continued)

(52) U.S. Cl.
CPC ................ *F16K 47/08* (2013.01); *F15D 1/02* (2013.01); *F16K 31/0655* (2013.01);
(Continued)

(58) Field of Classification Search
CPC ........ F16K 15/023; F16K 15/06; F16K 15/18; F16K 31/0655; F16K 47/00; F16K 47/08;
(Continued)

(56) References Cited

U.S. PATENT DOCUMENTS

| 967,514 | A | * | 8/1910 | Groh | ...................... F16K 15/026 |
| | | | | | 137/515.5 |
| 1,497,726 | A | * | 6/1924 | Keenan | ..................... F16K 1/36 |
| | | | | | 137/237 |

(Continued)

FOREIGN PATENT DOCUMENTS

| CN | 103038505 A | 4/2013 |
| CN | 103080619 A | 5/2013 |

(Continued)

OTHER PUBLICATIONS

Japanese Office Action for related Japanese Application No. JP2016-515706 dated Aug. 30, 2016 and its English Translation.

(Continued)

*Primary Examiner* — William M McCalister
(74) *Attorney, Agent, or Firm* — McCormick, Paulding & Huber LLP

(57) ABSTRACT

The invention to a valve unit (1) for a synthetically commutated fluid working machine (51), comprising a valve body (19,57), a movably arranged valve unit (3) and a separate fluid flow influencing unit (13, 25, 31, 35, 46, 56). The fluid flow influencing unit (13, 25, 31, 35, 46, 56) comprises a fluid flow influencing means part (18) and an attachment means part (28, 34, 38) for mechanical connection with the valve body (19). The attachment means part (Continued)

(28, 34, 38) and the fluid flow influencing unit (18) are connected to each other by a connection means part (27, 30, 33, 40, 47). The circumferential extent of the attachment means part (28, 34, 38) is larger as compared to the circumferential extent of the connection means part (27, 30, 33, 40, 47).

21 Claims, 8 Drawing Sheets

(51) Int. Cl.
- *F16K 31/06* (2006.01)
- *F16K 47/00* (2006.01)
- *F16K 47/08* (2006.01)
- *F04B 53/10* (2006.01)

(52) U.S. Cl.
CPC .............. *F16K 47/00* (2013.01); *F04B 53/10* (2013.01); *F16K 31/02* (2013.01)

(58) Field of Classification Search
CPC . Y10T 137/7915; Y10T 137/792; F15D 1/02; F04B 53/10
USPC ........................................ 137/533.21, 533.31
See application file for complete search history.

(56) References Cited

U.S. PATENT DOCUMENTS

| | | | | |
|---|---|---|---|---|
| 1,568,940 A * | 1/1926 | Dooley | ................. | F16K 15/063 137/533.29 |
| 2,356,360 A * | 8/1944 | Smolensky | ........... | F16K 15/063 137/533.31 |
| 2,372,629 A | 3/1945 | Nelson | | |
| 2,401,856 A * | 6/1946 | Brock | .................... | F16B 21/18 137/533.13 |
| 2,594,641 A * | 4/1952 | Griffith | ................. | F16K 15/063 137/543 |
| 3,845,784 A | 11/1974 | Sullivan | | |
| 3,937,249 A | 2/1976 | Suey | | |
| 4,368,756 A * | 1/1983 | Carlson | ................... | F16K 15/06 137/541 |
| 4,535,808 A * | 8/1985 | Johanson | .............. | F16K 15/063 137/533.21 |
| 4,665,943 A * | 5/1987 | Medvick | ................. | F16K 15/00 137/543.17 |
| 4,862,913 A * | 9/1989 | Wildfang | .............. | F16K 15/063 137/516.29 |
| 4,993,451 A * | 2/1991 | Kremer | ................... | F16K 1/302 137/454.2 |
| 6,050,295 A * | 4/2000 | Meisinger | ............. | F16K 15/063 137/541 |
| 6,866,062 B2 * | 3/2005 | Lammers | .............. | F16K 15/063 137/513.7 |
| 7,458,561 B2 * | 12/2008 | Oishi | ...................... | F16K 11/07 137/625.65 |
| 2005/0264100 A1 | 12/2005 | Enerson | | |
| 2012/0118406 A1 | 5/2012 | Egeworth | | |
| 2013/0032747 A1 | 2/2013 | Stein et al. | | |

FOREIGN PATENT DOCUMENTS

| | | |
|---|---|---|
| DE | 27 26 645 A1 | 12/1978 |
| GB | 1 428 596 | 3/1976 |
| GB | 2171779 A | 9/1986 |
| JP | H09-264442 A | 10/1997 |
| WO | 2010/073040 A1 | 7/2010 |

OTHER PUBLICATIONS

International Search Report for PCT Serial No. PCT/EP2014/059880 dated Jul. 21, 2014.

* cited by examiner

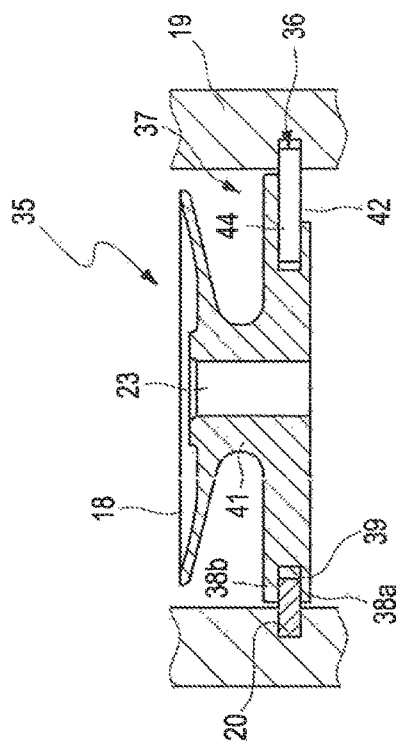
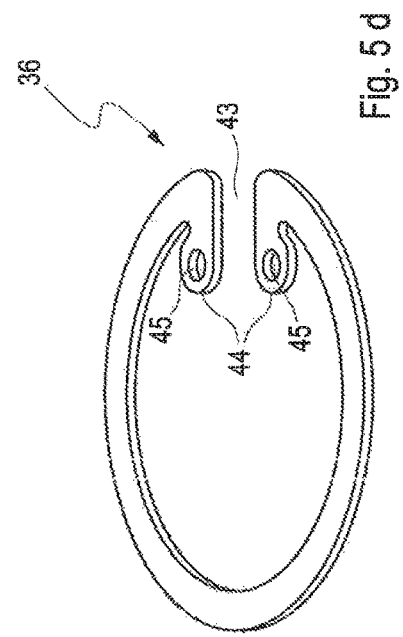
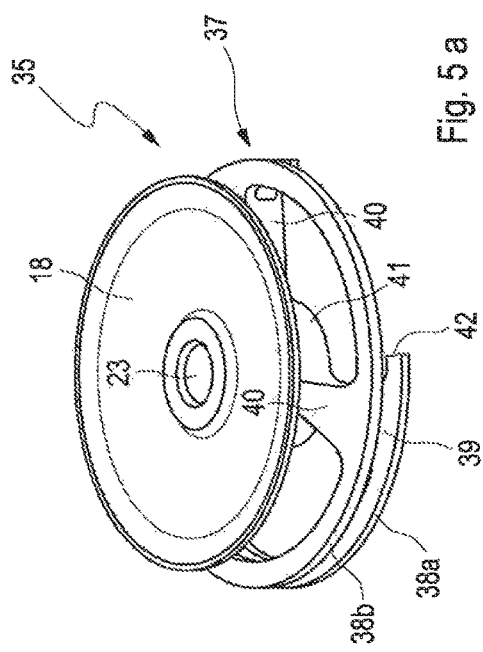
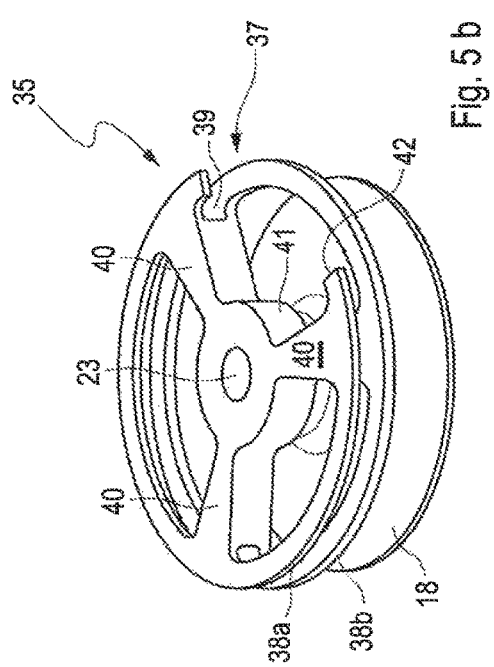

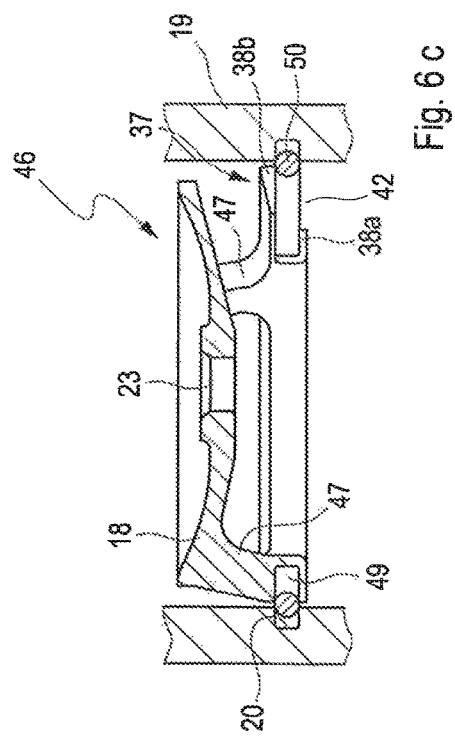
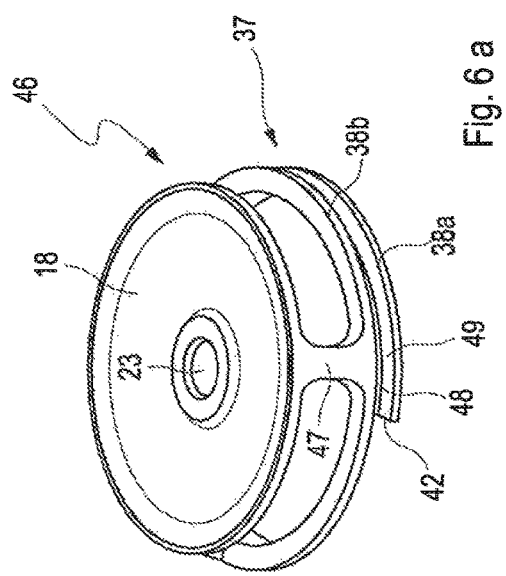
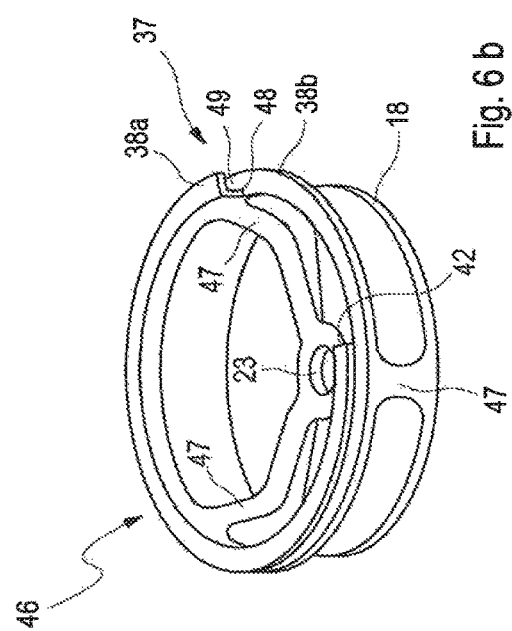

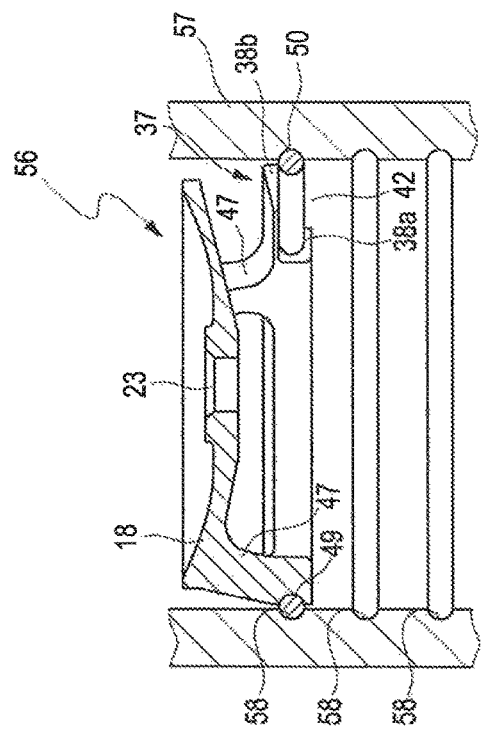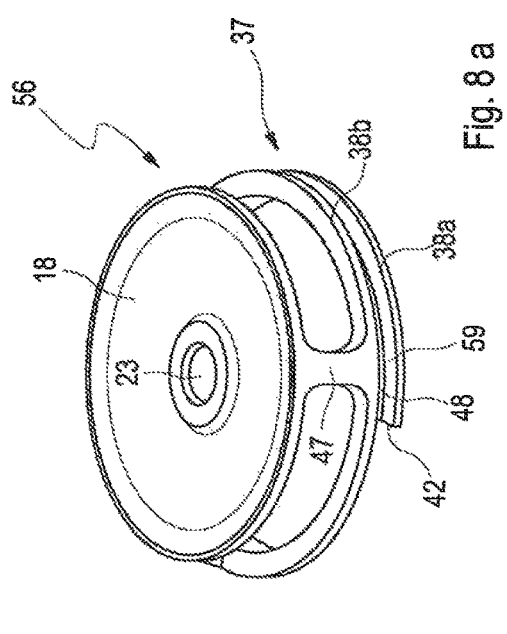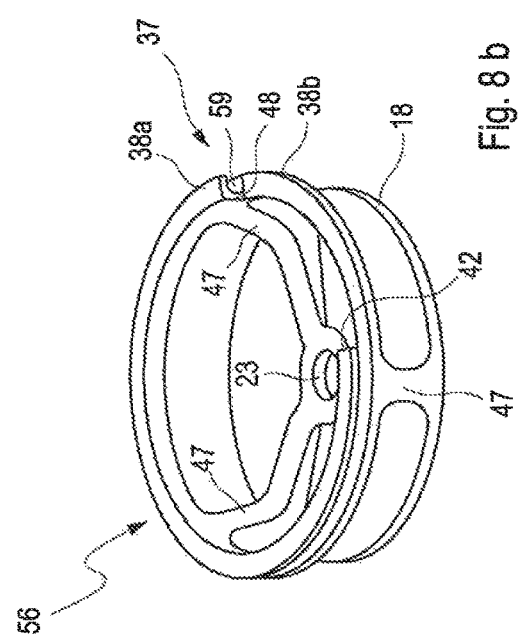

ATTACHMENT OF A FLUID FLOW HAT FOR ACTUATED VALVE

CROSS-REFERENCE TO RELATED APPLICATIONS

This application is entitled to the benefit of and incorporates by reference subject matter disclosed in the International Patent Application No. PCT/EP2014/059880 filed on May 14, 2014 and European Patent Application No. 13170168 filed on May 31, 2013.

TECHNICAL FIELD

The invention relates to a valve unit for a fluid working machine, comprising a valve body, a movably arranged valve closure device and at least one separate fluid flow influencing unit. The invention further relates to a fluid working machine, in particular a synthetically commutated fluid working machine.

BACKGROUND

Fluid working machines are used in various technical fields. For example, they are used if the pressure of a fluid has to be increased. In this case, the fluid working machine is generally referred to as a pump. Also, in some fields fluid working machines are used to generate mechanical power out of pressurized fluid. Here, the pressure of the fluid is converted into mechanical energy. This type of fluid working machine is generally referred to as a fluid motor. More advanced fluid working machines can even combine both functionalities. Depending on the mode in which they are used, they either work as a fluid motor or as a fluid pump.

Depending on the technical field, the fluid can be a liquid (for example hydraulic oil or even water in the field of hydraulics) or a gas. Of course, mixtures between fluid and gas and hypercritical fluids (where a distinction between gas and liquid cannot be made anymore) can be used as well. It should be noted that it is also possible that a certain amount of solid-state particles can be contained in the fluid as well.

One particular subset of fluid working machines are the so-called synthetically commutated fluid working machines that are also known as DDP (DDP for Digital Displacement® pump). These synthetically commutated hydraulic machines form a unique type of fluid working machines. Instead of passive valves that open or close under the influence of a differential pressure on both sides of the respective valve, at least a part of the valves are replaced by actuated valves. Typically, if the fluid working machine is solely used as a hydraulic pump, only the low-pressure valves are replaced by actuated valves. The basic principle is that the inlet valve that is fluidly connected to a working chamber can remain open after the working chamber has reached its maximum volume and starts to contract again. If the fluid valve remains open for the complete contracting cycle, the fluid is simply pushed back into the low-pressure fluid reservoir, without performing any useful work (and without consuming a significant amount of mechanical work). If, on the other hand, the fluid valve is closed at the very beginning of the contracting cycle, the fluid in the working chamber is pressurized and ejected through a high-pressure valve (that can be a passive valve in the case of a fluid pump). Another option is to close the fluid valve somewhere between these two extremes. In this case, an essentially arbitrary partial volume of the working chamber can be pressurized and pumped to the high-pressure side of the fluid pump.

If the high-pressure valves (i.e. those fluid valves that are connected to the high-pressure fluid manifold) are replaced by actuated valves as well, a fluid motor or a combined fluid pump and motor can be realised that is able of part-stroke pumping and/or part-stroke motoring modes.

Such synthetically commutated fluid working machines are known in the state of the art for several years.

A particular problem of the synthetically commutated fluid working machine design is that actuated valves are needed through which significant fluid flow rates can be passed through in two opposite directions. Of course, a fluid flow in a certain direction should not lead to an unwanted switching of the respective valve due to forces induced by the fluid flowing through the respective actuated valve (which usually relates to its open state). This is in particular true for the ejection fluid flow through a low-pressure valve during the exhaust cycle of an idle-stroke (no effective pumping done) or a part-stroke cycle (where only a part of the working chamber's fluid volume is pumped to the high-pressure side), when the valve is still open and not yet energised to be closed.

In such a case, significant fluid flow forces can act on the valve that can lead to an early/unwanted closure of the respective valve, in particular if the fluid working machine is operated at higher rotational speed (rpm, for example).

The same can be true for the high-pressure side, if actuated valves are used for the high-pressure side as well (which is usually the case for fluid motors or combined fluid motors and pumps).

A way to address this problem was suggested in the international patent application WO 2010/073040 A1. Here, it was suggested (among other possibilities) to use a fluid barrier upstream of the valve's poppet to "shield" the valve poppet from fluid forces induced by a fluid flow, flowing in the closing direction of the valve poppet.

Experience has shown that these fluid barriers (sometimes addressed as "fluid hats") work well in practice. However, it is still problematic to manufacture actuated valves, comprising such fluid hats in an effective, reliable, cost-effective and serviceable way. For manufacturing reasons, it is essentially unavoidable to provide the fluid hats as a separate part that has to be attached somehow to the valve body during the manufacturing process. Of course, the method for connecting the fluid hat to the valve's body should be as simple and as fast as possible. On the other hand, one has to realise that a significant force is exerted frequently on the fluid hat during operation of the fluid working machine. This frequent mechanical load should not result in a loosening of the fluid hat (or parts of it), since this can compromise the operation of the whole fluid working machine and can even lead to a destruction of the complete fluid working machine. In reality, it is therefore advisable to exchange the fluid hats after a certain operational time span. This leads to the auxiliary condition that a servicing of the fluid working machine (in particular an exchange of the fluid hat) should be possible without too many efforts.

Fulfilling all these conditions at the same time is a remarkable task where so far no convincing solution has been proposed.

For example, it was proposed to attach the fluid hat through anchoring webs, where the ends of the anchoring webs are spaced between two parts of the fluid working machine that are attached to each other by means of a thread. However, replacement of a fluid hat that is attached in this way requires a removal of significant parts of the fluid working machine. This results in significantly increased service cost.

SUMMARY

The object of the invention is therefore to provide a valve unit, where the valve head is attached to the valve body in a way that is improved over attachment techniques that are known in the state of the art. Another object of the invention is to provide a fluid working machine that is improved over fluid working machines that are known in the state of the art.

The invention solves the problem.

It is suggested to design a valve unit for a fluid working machine, in particular a valve unit for a synthetically commutated fluid working machine, where the valve unit comprises a valve body, a movably arranged valve closure device and at least one separate fluid flow influencing unit and wherein said fluid flow influencing unit comprises at least one fluid flow influencing means part and at least one attachment means part for mechanical connection with said valve body, wherein said attachment means part and said fluid flow influencing unit are connected to each other by at least one connection means part in a way that the circumferential extent of said attachment means part is larger as compared to the circumferential extent of said connection means part. This way, it is very simple to combine a comparatively large fluid flow cross-section (and hence optimising the possible fluid flow throughput) with increasing the mechanical strength between the fluid flow influencing unit and the valve body at the same time. The movably arranged valve closure device can be moved particularly with respect to the valve body. By a "circumferential extent", an extent in an angular dimension and/or a dimension around the circumference (in particular in case of a more or less circular or elliptical shape) and/or in a lengthwise dimension can be envisaged. Typically, a combination of both is particularly preferred. When talking about a "circumferential extent", with respect to the "circumference" not only radially arranged geometries without sharp corners (like circular, ellipsoidal or oval geometries) can be understood. As an example, a triangular, quadratic, pentagonal, hexagonal, heptagonal, octagonal and so on geometry can be envisaged as well (in particular, n=9, 10, 11, 12, 13, 14, 15, 16, 17, 18, 19, 20 and so on edges can be envisaged). Of course, not only regular polygons, but also irregular polygons can be used. Additionally, a "distortion" to the basic geometrical shape can be provided as well. In other words, the idea is to extend the connection means at and/or in the vicinity of the interface between the fluid flow influencing unit (more exactly the attachment means part) and the valve body of the valve unit in a "lengthwise sense". Another alternative wording is to increase the angular dimension around the centreline, where the angular extent is measured in the direction of a circumferential line. Thus, the attachment length, attachment angle and/or the attachment area can be increased as compared, in particular as compared to the "connection area". The fluid flow influencing unit can be provided as some sort of a fluid barrier or a fluid hat. Of course, it is not necessary (although possible) that the fluid hat covers the movable valve closing element (for example a valve poppet) completely, essentially completely or large parts of it. The fluid flow influencing unit usually comprises at least one fluid flow influencing means part, at least one attachment means part and at least one connection means part (although additional components are possible as well). When applying the generic notions to a possible embodiment, the fluid flow influencing unit is typically equivalent to the "complete" fluid hat or fluid barrier, the fluid flow influencing means part is typically equivalent to the typically disc-like-shaped fluid barrier, the connection means part is typically equivalent to the connection webs that are connecting the "inner radial sections" of the fluid hat to the "outer radial sections" (like the attachment means), while the attachment means are typically the parts of the fluid flow influencing unit that are performing the "anchoring function" of the fluid flow influencing unit within the valve unit, in particular the valve body. It should be noted, that of course every part of the fluid flow influencing unit (in particular the connection means part) can have an influence on the fluid flow as well, in particular if they are located within areas of the valve unit where a fluid flow is present. However, these fluid influences are so to say "unintentional", while the "intentional influences" on the fluid flow are shielding effects for a movable valve part, means for generating lower and/or higher pressure volumes (in particular using the Venturi-effect), means generating a fluid flow in a "certain direction" or the like.

In particular, the valve unit can be designed in a way that the circumferential extent of said attachment means covers large parts of the circumference and preferably covers essentially the full circumference. By the notion "large parts", a fraction of at least 20%, 25%, 30%, 33%, 40%, 50%, 60%, 66%, 70%, 75%, 80%, 90% or 95% can be understood. An extent "that covers essentially the full circumference" is typically equivalent to at least 97, 98, 99 or 99.5% of the complete circumferential extent (i.e. the circumference). This way, a particularly mechanically stable connection between the fluid flow influencing unit and the valve body can be realised. Since the circumferential extent of the connection means part is (significantly) smaller, such a large portion of the attachment means part has no (typically has no "considerable") negative adverse effects on the fluid flow past the fluid flow influencing unit.

Furthermore, it is possible to design the valve unit in a way that the mechanical connection between said at least one attachment means part and at least part of said valve body is effectuated using at least one additional fixation means, in particular by at least one connecting wire means and/or at least one snap ring means and/or at least one circlip means. This way, the mechanical stability of the attachment of the fluid flow influencing means within the valve body can be even further enhanced. Additionally, a placement and a removal of the fluid flow influencing unit (for example for servicing purposes) can be made possible in an easy way. In particular one should keep in mind that the additional fixation means can be designed as disposable parts. Therefore, they can be broken into several pieces when the fluid flow influencing unit has to be removed for maintenance or replacement.

Another preferred embodiment of the valve unit can be achieved if at least one attachment means part and/or said valve body comprises at least one recess part for introducing and/or for manipulating at least one additional fixation means. Preferably, both the attachment means part and the valve body comprise at least one recess part. This way a particular preferred design with a particular low fluid flow resistance can be achieved. The recess part can be foreseen either in the attachment means part, in the valve body or in both units. In particular, it is possible to provide a plurality of recess parts, in particular a plurality of recess parts in the valve body. This way, it is possible to attach the attachment means part (and therefore the fluid flow influencing unit) at different positions. This way, it is possible to adapt some kind of a "generic system" for different working conditions (for example use of hydraulic oil with a different viscosity, using different fluid flow influencing units and/or for manufacturing different models of valves or pumps). Such an adaption can be made as a part of some kind of a maintenance procedure to change the resulting pump's abilities. However, it is also possible to attach a suitable fluid hat inside the valve body at the factory (essentially once), so that a variety of suitable pump designs can be realized with a single valve body part ("fix and forget"-design). To make the device not too complicated, a comparatively small number of such recesses is favourable, for example 2, 3, 4, 5, 6, 7 and/or 8 recesses (in particular in the valve body part). In particular, the design of the recess (or of the plurality of recesses) can be made in a way that (apart from the recess) an at least essentially smooth surface is present in the vicinity of the recess (in case of a cylindrical form no change in diameter, for example). Additionally and/or alternatively, the movement of the attachment means part relative to the valve body is blocked essentially solely by the recesses and the corresponding at least one additional fixation means. In other words, no "shoulder" of the valve body part (or a part with a similar function) is necessary, since the positioning can be realised solely depending on the combination of the recess and the additional fixation means. This can simplify the manufacture of the valve body and thus presumably of the whole device. Furthermore, providing a plurality of recesses is simplified by such a design. Also by such a design fluid flow obstacles protruding into the fluid flow path can be effectively avoided. Additionally and/or alternatively it is a possible that the recess and the additional fixation means are corresponding to each other in shape and/or dimension. As an example, if a circlip and/or a snap ring with a rectangular cross-section is used as an additional fixation means, it is possible that one or both (presumably even more) recesses show a rectangular cross-section as well. Likewise, if a (circular) wire is used as an additional fixation means, the recesses should preferably show a semi-circular cross-section. In particular if this feature is combined with a similar dimension (size), a particular solid, low noise and wear-resistant connection between the respective components can usually be realised. This can result in improved behaviour of the machine and less frequent service intervals. Only for completeness it should be mentioned that essentially all shapes are usable as a cross-section for the recesses/additional fixation means, for example elliptical cross sections, oval cross-sections, polygonal cross-sections and the like.

The valve unit can be designed in a way that said fluid flow influencing unit, in particular in a way that said at least one connection means part and/or said at least one attachment means part and/or said additional fixation means is at least partially elastically deformable. This way, a very easy mounting (and presumably dismounting) of the valve influencing unit in the valve body can be realised. As an example, the respective parts can be deformed to reduce the diameter and allow the fluid flow influencing unit to be introduced into the valve body and after this the fluid flow influencing unit is simply moved forward until it "snaps" for example by radial expansion of the component in its design position (i.e. a clip-like attachment). Such a mounting relying on the deformability of a fluid flow influencing unit is of course very simple.

Furthermore it is possible to design the valve unit in a way that at least one mechanical connection between at least one of said attachment means parts and at least part of said valve body is designed as a form-fitting connection, in particular as a groove-web-connection. First experiments have shown that such a connection can be particularly advantageous.

Furthermore it is suggested to design the valve unit in a way that at least one of said connection means, in particular a combination of at least two or more connection means is designed in a fluid-flow throughput enhancing way, in particular in that at least one of said connection means is designed as a stud-like connection means and/or with a fluid-flow enhancing cross-section. This way the fluid resistance of the overall valve can be reduced, thus reducing energy consumption of the device, the valve is used in (for example of a fluid pump). A fluid flow enhancing cross-section can be, for example, of an elliptical shape. Of course, different shapes that are known in the state of the art as such can be used as well. It has to be noticed that the fluid flow regularly flows in two different, opposing directions, with the consequence that the "standard shape" of a drop-like cross-section is quite often not the optimum shape for the respective device.

Another preferred design of the valve unit can be accomplished, if said fluid flow influencing unit is designed and arranged in a way that it can be installed and preferably installed and removed without manipulating said valve body and/or said movably arranged valve closure device. This way, the construction and presumably even the maintenance of the respective overall unit can be simplified.

It is furthermore suggested to design the valve unit in a way that at least one fluid flow influencing unit and/or at least the valve part of said valve unit is designed to be essentially radially symmetric. This way, it is possible to use standard valve unit designs that are already used in the state of the art. Therefore, the improved valve unit, as presently suggested, can be realised much easier. This, of course, can improve the acceptance of the presently proposed design quite significantly. It is even possible, that the improved design can be realised as an "almost drop-in solution" (where only minor modifications of a present valve unit are necessary—if at all).

In particular, it is possible to design the valve unit in a way that said valve unit is essentially of a poppet valve type and preferably comprises an essentially circumferentially arranged valve seat part. At present, this is the standard design of actuated valve units for synthetically commutated fluid working machines. Therefore, this particular design is even closer to an "almost drop-in solution", thus possibly increasing the acceptance of the proposed design even further. In particular, the movably arranged valve closure device can be designed as a valve poppet.

It is further suggested to design the valve unit in a way that said at least one fluid flow influencing unit is arranged on the opposite side of the movably arranged valve closure device, in particular the valve poppet with respect to the valve seat. This is typically the optimum place for such a fluid flow influencing unit. In particular, this statement is particularly valid for the fluid flow influencing means part of the fluid flow influencing unit.

It is further suggested to design the valve unit as an actuated valve unit, in particular as an at least partially electrically actuated valve unit. This is the presently preferred design for valve units with respect to synthetically commutated fluid working machines. Thus, this design is particularly preferred. The respective actuator can be mechanically connected to the movably arranged valve closure device or can act on it by means of fields, in particular by means of magnetic fields.

Yet another enhancement of the valve unit can be realised if said at least one fluid flow influencing unit is designed and arranged to avoid an uncommanded actuation of the valve unit, in particular an uncommanded actuation of the valve unit due to fluid flow forces. An uncommanded actuation of valve unit can adversely affect the operational behaviour of the resulting unit, the valve unit is used for, even quite considerably. Therefore, if such uncommanded actuations of the valve unit are avoided in essentially all cases and/or even under adverse operating conditions (for example cold hydraulic oil, high operating speed and so on), the resulting machine can have superior operational characteristics. In particular, an unwanted movement of the movably arranged valve closure device should be avoided. Methods for achieving this functionality can be particularly found in international patent application WO 2010/073040 A1, the disclosure of which is incorporated into the disclosure of this document by reference.

Furthermore, it is suggested that a fluid working machine is designed in a way that it comprises at least one valve unit according to the previous suggestions. The fluid working machine can be particularly a synthetically commutated fluid working machine. Valve units according to the previously described design are particularly well-suited for fluid working machines, in particular synthetically commutated fluid working machines. This is because their advantageous features are particularly suitable for the needs of the respective fluid working machine. Therefore, the fluid working machine can show the same features and advantages, as previously described, at least in analogy. Also, it is possible to modify the respective fluid working machine in the previously described sense, at least in analogy. This way, even more advantages can be achieved.

In particular, it is possible if the fluid working machine is designed in a way that the at least one valve unit is used as a low-pressure valve unit. Here, the cross-sections have to be particularly large (with the consequence that typically the movable valve unit parts are large as well, thus showing a typically large sensitivity against fluid flow forces). This is, because the relative pressure changes are very large, even if the absolute value is not that large. As an example, at a low-pressure valve unit, the "standard pressure" is close to ambient pressure, i.e. 1 bar. Therefore, if a pressure difference of only 0.2 bars across the valve orifice occurs, this results in a relative pressure change of 20%. Thus, the low-pressure side of a fluid working machine is typically particularly prone to problems that can be resolved with the presently suggested valve unit design.

BRIEF DESCRIPTION OF THE DRAWINGS

Further advantages, features, and objects of the invention will be apparent from the following detailed description of the invention in conjunction with the associated drawings, wherein the drawings show:

FIG. 5: shows a fourth embodiment of a fluid hat in different schematic views from different directions;

FIG. 6: shows a fifth embodiment of a fluid hat in different schematic views from different directions;

FIG. 8: shows a sixth embodiment of a fluid hat in different schematic views from different directions.

DETAILED DESCRIPTION

Figure 1:
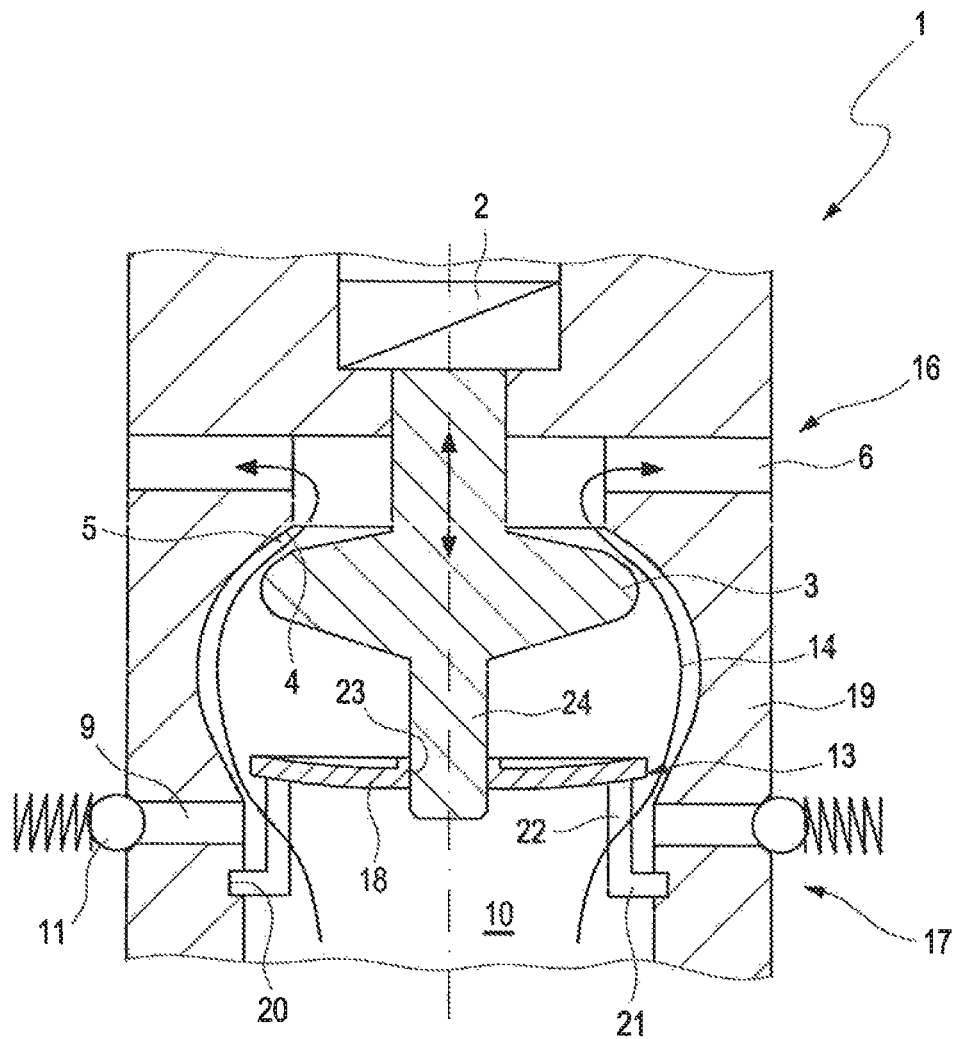
FIG. 1: shows a possible embodiment of an actuated valve with a fluid hat in a schematic cross section.
Figure 7:
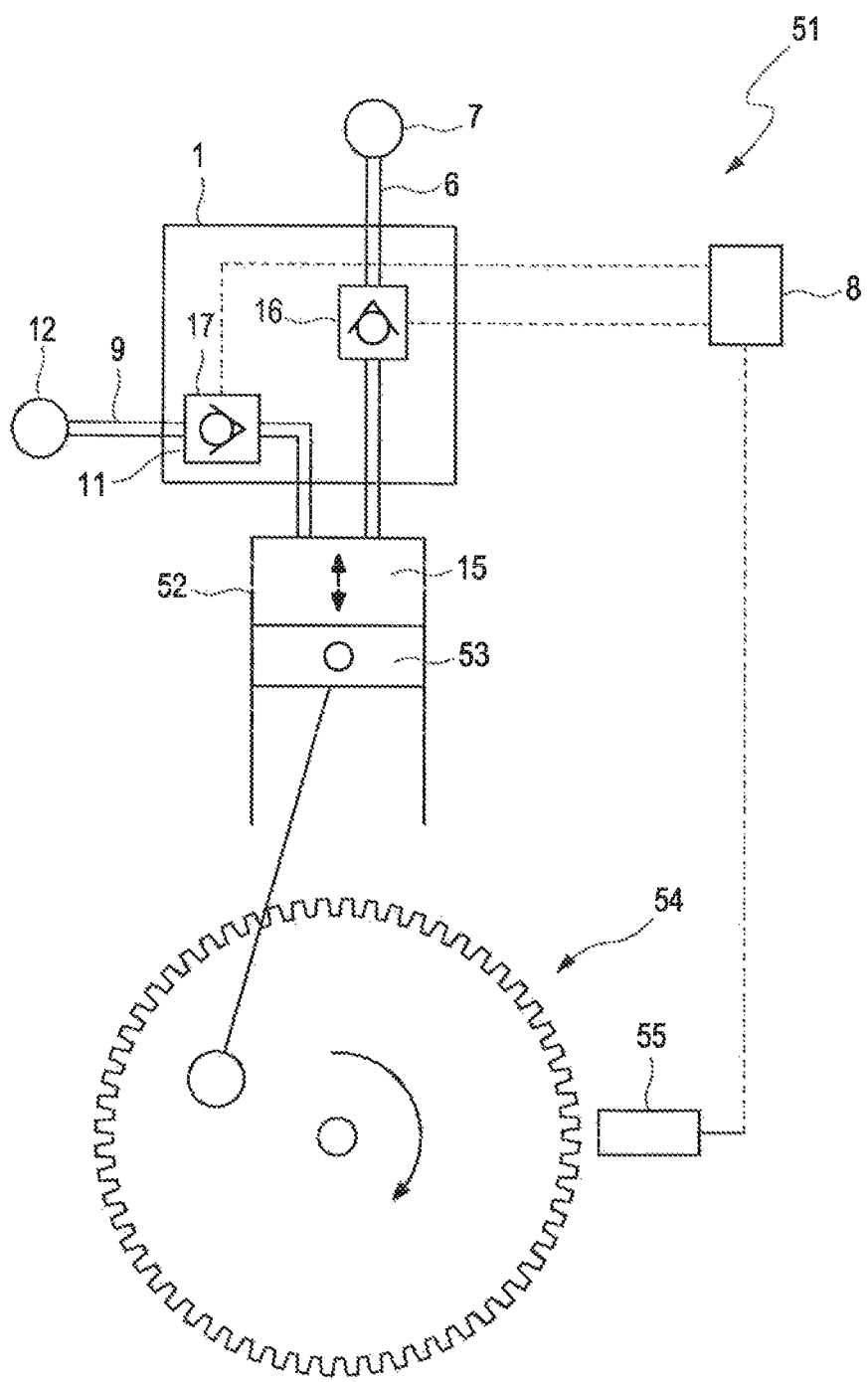
FIG. 7: shows a schematic drawing of a synthetically commutated hydraulic pump.

In FIG. 1, a schematic cross-section through an actuated valve 1 that is particularly suitable for a synthetically commutated hydraulic machine 51 (also known as a DDP-machine for "Digital Displacement® pump"; see FIG. 7) is shown. The actuated valve 1 comprises an actuator 2 that is presently of an electromagnetic design. The actuator 2 actuates a valve poppet 3 that can be moved in a vertical direction (indicated by a double-headed arrow in FIG. 1). By the vertical movement of the valve poppet 3, the valve poppet 3 can be placed onto or moved away from the valve seat 4, thus opening or closing a valve orifice 5 that is connecting to the low-pressure outlet 6 of the actuated valve 1. The low-pressure outlet 6 can be connected to a low-pressure fluid reservoir 7 (see FIG. 7). The actuator 2 of the actuated valve 1 can be actuated by a control unit 8 that is preferably of an electronic type (for example a single-printed board computer device).

In the presently shown example the actuated valve 1 is of an essentially circular design and is essentially radially symmetric. Small deviations from the symmetry (for example due to some attachment webs or the design and/or the placement of the high-pressure check valves 11 or the like) are possible, of course.

It is possible that a plurality of recesses 20 is provided along the inner surface of the valve body 19 (at sensible intervals). By mounting the fluid hat 13 at different heights (axial direction of the valve body 19), it is possible to adapt the actuated valve 1 to different operating conditions, for example to adapt it for use with hydraulic oil of different viscosity. This can be done once at the factory for realizing a variety of different actuated valve models. Additionally or alternatively this can be done for retrofitting an already used actuated valve as part of a maintenance procedure. Hence, it is possible to have some kind of a generic actuated valve 1 design that can be used for a plurality of operating conditions and/or different fluid hats without the need for additional machining. An implementation of such a design can be seen in FIG. 8c. However, it is of course possible to use this feature universally, in particular in combination with any of the disclosed embodiments.

Furthermore, in FIG. 1 the high-pressure outlet 9 is shown. If a pressure will be generated due to a pressure increase in the distribution chamber 10 (being in fluid communication with the working chamber 15) of the actuated valve 1 (this necessitates that the actuated valve 1 is closed, i.e. the valve poppet 3 rests on the valve seat 4), a plurality of spring-loaded check valves 11 open and pressurized fluid is ejected through the high-pressure outlet 9 to a high-pressure fluid reservoir 12 (see FIG. 7). In the presently shown example, only the low-pressure valve part 16 of the actuated valve 1 is designed as an actuated valve unit, while the high-pressure valve part 17 is designed as a passive valve unit. The passive valve unit comprises a plurality of spring-loaded check valves 11.

Furthermore, in FIG. 1 a fluid hat 13 is shown. The fluid hat can be chosen of a variety of different designs. A selection of possible varieties is shown and described in detail in the following. The fluid hat 13 is used to prevent a backward fluid flow (indicated by arrows 14) that is directed from the working chamber 15 back through the still open low-pressure valve part 16 of the actuated valve 1 to the low-pressure manifold 7 to exert significant fluid forces on the valve poppet 3 in a way that an uncommanded closure of the low-pressure valve part 16 is avoided since the backward fluid flow 14 is directed around the valve poppet 3 by the barrier part 18 of the fluid hat 13.

The fluid hat 13 is designed as a separate member. Therefore, it has to be fixedly attached within the valve body 19 of the actuated valve. For this purpose, recesses 20 are provided in a certain part of the valve body 19. The shapes of the recesses 20 depend on the actual design of the fluid hat 13 chosen. The recesses 20 are used for anchoring projections 21 (attachment means) that are provided at the lower end of the webs 22 (connection means part) of the fluid hat 13. This way, the barrier part 18 (fluid flow influencing means part) of the fluid hat 13 (fluid flow influencing unit) is held in place.

As can be further seen, in the middle of the barrier part 18, a through-hole 23 is provided. This through-hole 23 is used for receiving a guiding pin 24 that is projecting from the valve poppet 3. The guiding pin 24 can slide in a direction co-axial to the valve poppet 3 through the through-hole 23, but is guiding in a radial direction (horizontal direction in FIG. 1). This way, the valve poppet 3 is stabilised.

Figure 2:
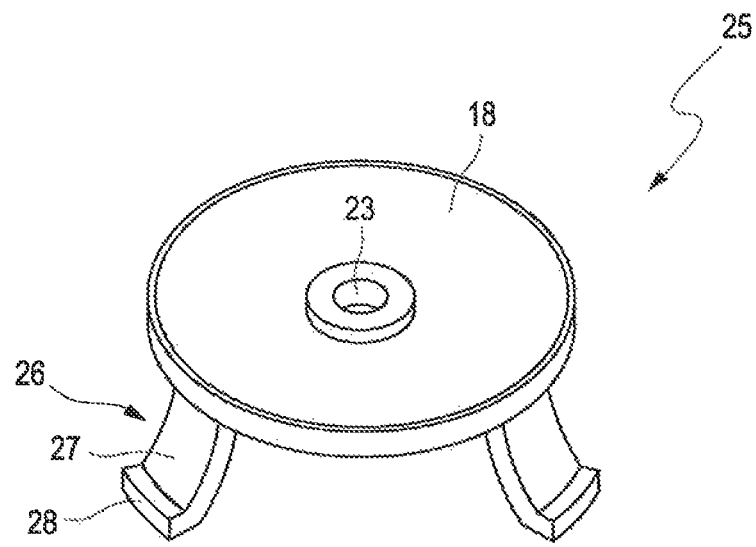
FIG. 2: shows a first embodiment of a fluid hat in schematic, perspective views from different directions.
Figure 2:
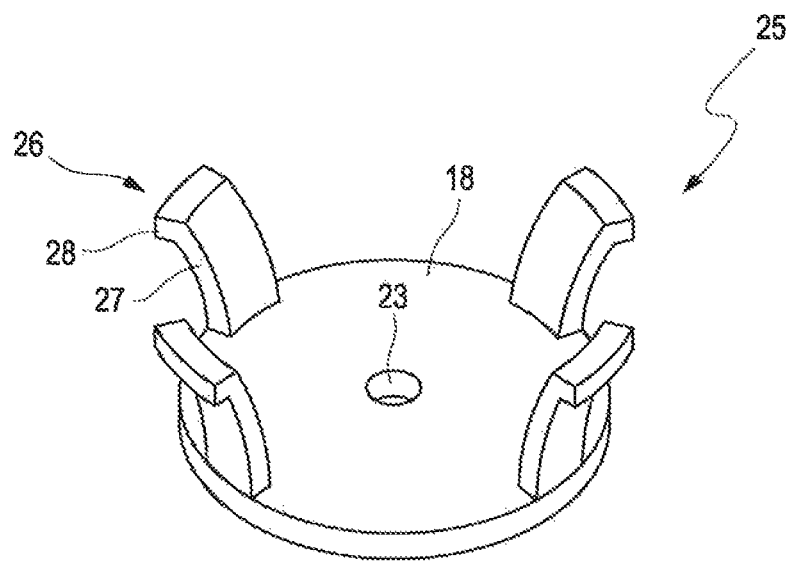

In FIG. 2, a first possible embodiment of a fluid hat 25 is shown in more detail in two different, schematic and perspective views. In FIG. 2a, a perspective view from a side of the fluid hat 25 that is facing the valve poppet 3 when installed in position is shown, while FIG. 2b shows the fluid hat 25 from the other side in a perspective view. The barrier part 18 and the through-hole 23 are similar to the situation as shown in FIG. 1.

The fixing in position is presently performed by four legs 26. Each leg 26 comprises a web part 27 and on lower part a bulge part 28. The bulge part 28 can snap in place, in particular into a recess 20 that is provided within the valve body 19 of an actuated valve 1. For this, the webs 27 are somewhat elastic. The elasticity is chosen in a way that the fluid hat 25 is held firmly into place, but can be inserted and removed from the recesses 20. Since the bulge part 28 of the legs is not projecting too far out (only 2 mm in the present case), the deformability of the webs 27 may be relatively small.

In the presently shown design of a fluid hat 25, the web part 27 and the bulge part 28 of the legs 26 are aligning each other. Therefore, the circumferential extent of the web part 27 and the bulge part 28 is essentially the same.

Figure 3:
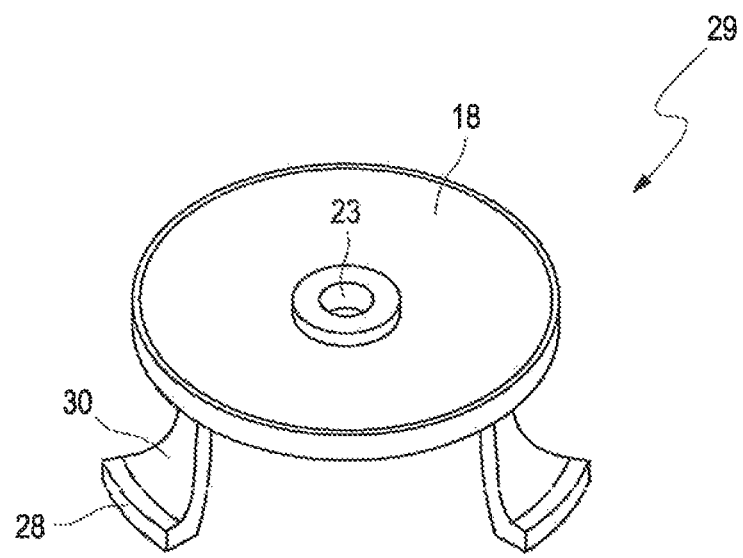
FIG. 3: shows a second embodiment of a fluid hat in schematic, perspective views from different directions.
Figure 3:
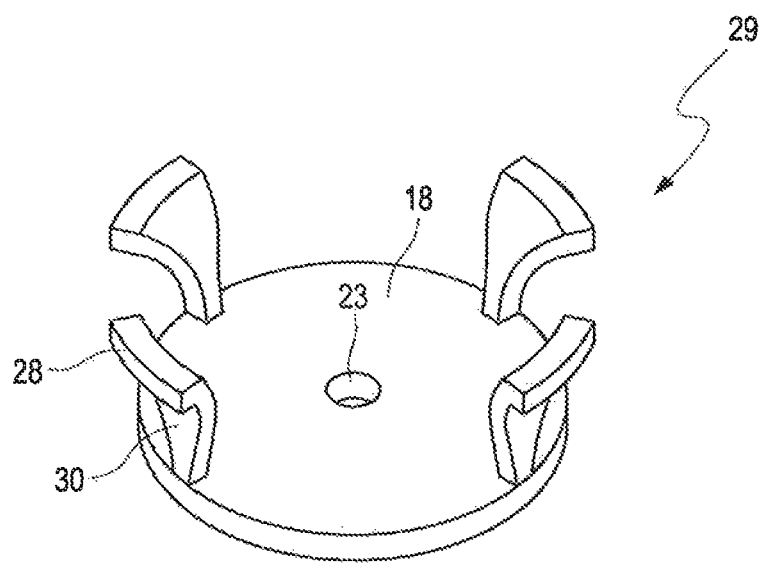

In FIG. 3, a second possible embodiment of a fluid hat 29 is shown schematically in two different perspective views. The views chosen are identical to the views chosen in FIG. 2. Furthermore, the barrier part 18 and the through-hole 23 of the presently shown fluid hat 29 are essentially identical to the fluid hat 25 of FIG. 2. Also, presently four legs 30 for the attachment of the fluid hat 29 inside the valve body 19 are used. The legs 30, however, are widening along their length. In particular, the legs 30 are quite narrow where they are connecting with the barrier part 18 of the fluid hat 29. On the opposite side, where the bulge part 28 of the respective leg 30 is provided, they show a significantly extended width. In the presently shown example, the width is about twice as long (although different factors can be used as well, in particular more than 1.1, 1.25, 1.5, 1.75, 2, 2.5, 3 or the like). This way, the mechanical fixation of the fluid hat 29 can be stronger as compared to the fluid hat 25 in FIG. 2. Despite this increased mechanical stability, the cross-section of the fluid channel provided for the fluid flow through the low-pressure valve part 16 is not obstructed too much. This way, a significantly improved fluid hat 29 can be provided. Of course, the dimensions of the recesses 20 and the valve body 19 have to be adapted accordingly.

Figure 4:
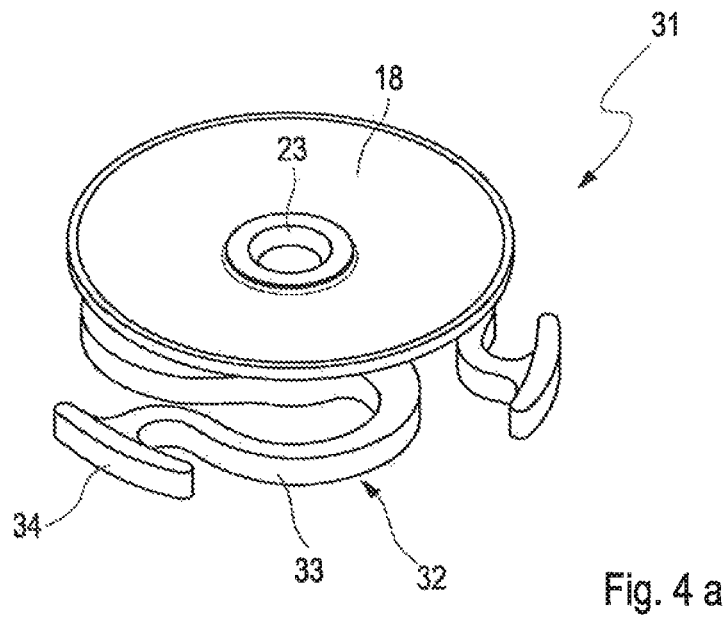
FIG. 4: shows a third embodiment of a fluid hat in schematic, perspective views from different directions.
Figure 4:
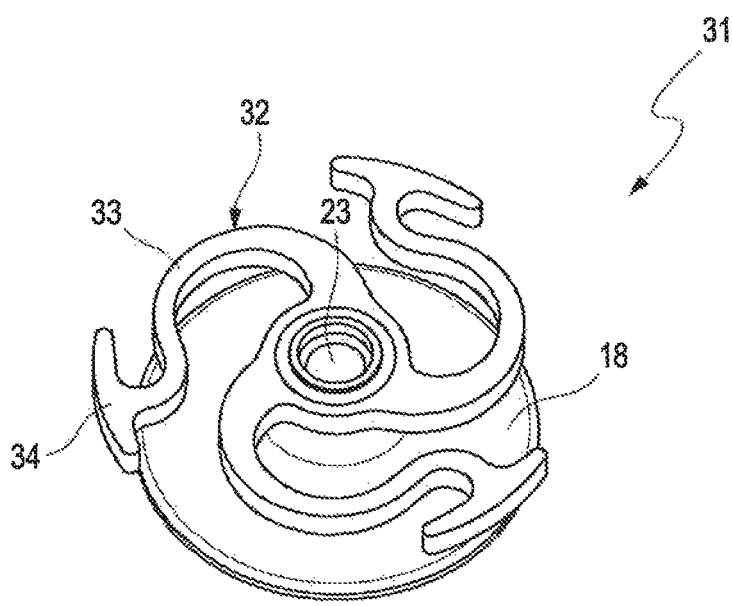

In FIG. 4, a third possible embodiment of a fluid hat 31 is shown. The schematic view from different perspective directions is identical to the views, chosen in FIG. 2 and FIG. 3.

Even the presently shown example of a fluid hat 31, the barrier part 18 and the through-hole 23 are essentially identical. The attachment legs 32, however, are designed differently and are a lying essentially in a plane that is parallel to the plane of the barrier part 18. Preferably, they are spaced apart by a pin-like connection that is not visible due to the angle of the views chosen. The attachment legs 32 (presently only three attachment legs 32, although a different number can be chosen), have a serpentine-shaped linking part 33 and an engagement part 34. When the fluid hat 31 is placed into position, the engagement part 34 will snap in place into the recesses 20 of the valve body 19. For this, the linking parts 33 have to have certain elasticity. Because the linking part 33 is relatively long and shows a serpentine-like shape, the elasticity of the linking part 33 can be relatively low whilst still allowing the engaging part 34 can be snap-fitted into the recesses 20.

Even with the design of the fluid hat 31 chosen, the radial and the lengthwise extent of the engagement parts 34 in a circumferential direction are significantly larger as compared to the circumferential extent of the linking parts 33. In the presently shown example, the factor between the "circumferential width" of the engagement part 34 and the linking part 33 is 5 (although a different ratio can be chosen as well, like more than a factor of 2, 3, 4, 5, 6, 7, 8, 9 or 10).

In FIG. 5 yet another possible embodiment of fluid hat 35 retention is shown. In FIGS. 5a and 5b, a schematic perspective view from different directions is shown (the directions are identical to those of FIGS. 2a, 2b, 3a, 3b, 4a and 4b, respectively). FIG. 5c shows a schematic cross-section through the fluid hat 35, while FIG. 5d shows an advantageous snap ring 36 that can be preferably used for attaching the fluid hat 35 into place, i.e. into the recess 20 that is provided within the valve body 19 of the actuated valve 1. Due to the design of the fluid hat 34 (which will be elucidated in the following), the recess 20 is preferably designed as a circular groove.

The fluid barrier part 18 and the through-hole 23 for receiving the guiding pin 24 of the valve poppet 3 are essentially identical to the previously shown designs of fluid hat 25, 29, 31. The attachment section 37, however, is designed differently. The attachment section 37 comprises two holding rings 38 that are arranged in parallel to each other, forming a receiving space 39 in between. The holding rings 38 are attached to the barrier part 18 of the fluid hat 35 via presently three radially arranged fillets 40 and a hollow-cylinder-shaped connecting pin 41 (having the through-hole 23 in the middle). As can be seen, in particular from FIG. 5b, only one of the holding rings 38, namely the holding ring 38b, neighbouring the barrier part 18, is continuously running around the whole circumference. The other, more distant holding ring 38a shows an interruption 42.

The attachment of the fluid hat 35 in the recess 20 of the valve body 19 is performed via a snap ring 36 (see FIGS. 5c and 5d). A snap ring 36 is an off-the-shelf product and widely available. Snap rings 36 can be squeezed together by virtue of a gap 43. In the vicinity of the gap 43, snap rings 36 typically show an enlargement 44 at both sides of the gap 43. Typically, within the enlargements 44, a manipulating hole 45 for convenient handling of the snap ring 36 is provided. These manipulating holes 45 can be used for insertion of a specially designed pair of pliers. The gap section 43 of the snap ring 36 with the two enlargements 44 is advantageously placed in the interruption section 42 of the respective holding ring 38a. This way, the manipulation of the snap ring 36 is not hindered by the holding rings 38, in particular not hindered by the holding ring 38a, which is very convenient.

In FIG. 6, a slightly modified fluid hat 46 with respect to the fluid hat 35 shown in FIG. 5 is depicted. The perspective views of FIGS. 6a and 6b are identical to the views of FIGS. 5a and 5b, while the cross-section of FIG. 6c is similar to the cross-section of FIG. 5c.

The fluid hat 46 shows two differences, as compared to the fluid hat 35 of FIG. 5. Firstly, the attachment of the holding rings 38a to the fluid barrier part 18 of the valve head 46 is performed by presently three holding columns 47 that are arranged on the radially outward side of the fluid hat 46. Secondly, the connection between the two holding rings 38 is performed by a rear side wall 48 (that is on the radially inner side of the snap rings 38). The resulting trench 49 that is formed by the rear side wall 48 and the holding rings 38 can be "filled" by a snap ring 36, similar to the embodiment, shown in FIG. 6 (also, an easy manipulation can be performed due to the interruption 42 of one of the holding rings 38, similar to the embodiment shown in FIG. 5). Presently, however, a wire 50 is chosen for attachment of the fluid hat 46 within the valve body 19. The wire 50 has an essentially circular cross-section, can be bent and can thus be introduced (and consecutively removed) through the interruption 42, even if the fluid hat 46 is in its mounting position. The wire 50 provides a form-fitting attachment of the fluid hat 46 via the recess 20 of the valve body 19 and the trench 49 of the fluid hat 46.

In FIG. 8 another possible embodiment of a fluid hat 56 and of a valve body 57 is shown. In the presently depicted embodiments, the fluid hat 56 is a variation of the fluid hat 35 that is depicted in FIG. 5, while the valve body 57 is a variation of the valve bodies 19, shown in all of the other Figs. For simplicity, for similar parts identical reference numbers are used (although the respective parts might be slightly different).

The fluid hat 56 shows essentially the same design as the fluid hat 35 of FIG. 5. However, the trench 59 of the attachment section 37 is formed in a way that the trench 59 shows essentially a semi-circular cross-section (as a reminder, the cross-section of the trench 49 according to the embodiments of the fluid flow hat 46, as shown in FIG. 5 is rectangular).

In a similar way, the recess 58, provided in the valve body 57, shows an essentially semi-circular cross-section (the "former trench 49" showed a rectangular cross-section). When the fluid hat 56 is placed in position inside the valve body 57, the "combined cross-section" of the trench 59 and of the recess 58 will have an essentially circular shape. Such a shape is advantageous, if a wire 50 (having a circular shape) is used as an additional fixation means. In particular, no significant play will be present between the wire 50 and the recess 58/the trench 59, respectively. Therefore, a good fixation of the fluid hat 56 inside the valve body 57 can be realised. It is to be understood that such a variation in shape of the recess and/or of the trench can be realised in different embodiments, as well.

The valve body 57 is additionally modified in that a plurality of recesses 58 is arranged on the inside wall of the valve body 57 (in the present embodiment at regular intervals; however, different intervals might be used as well). This way, it is possible to attach the fluid hat 56 at different positions (in an axial direction) inside the valve body 57. This way, one can adapt the overall device to different operating conditions, without the need of additional machining. Such adaption might be used with the same fluid hat 56 for adaption to different oil viscosities (as an example). However, it is also possible to provide a "generic valve body 57" that can be used with several different fluid hats (presumably showing a different dimension, in particular with respect to their extent in an axial direction).

Of course, providing a plurality of recesses is possible irrespective of the specific embodiment and/or the specific cross-section of the respective recesses. It is even possible to provide different recesses with (partially) different cross-sections.

Finally, in FIG. 7, a possible embodiment of a synthetically commutated fluid working machine 51 is shown in a schematic representation. The synthetically commutated fluid working machine 51 has a working chamber 15 that is formed by a cylinder 52 and a piston 53. The working chamber 15 has a cyclically varying volume through an up-and-down movement of the piston 53. The up-and-down movement of the piston 53 is effectuated by a piston rod arrangement 54. The position of the piston 53 can be evaluated by a sensor 55.

When the volume of the working chamber 15 expands, fluid is introduced into the working chamber 15 from a low-pressure fluid reservoir 7 through the low-pressure valve part 16 of the combined actuated valve 1. Due to the pressure differences, the valve poppet 3 will be moved into the open position. When the piston 53 passes its bottom dead centre, the volume of the working chamber 15 will start to decrease again. When the valve poppet 3 is still in its open position, the hydraulic fluid is simply re-ejected (flowing along backward fluid flow path 14) into the low-pressure fluid reservoir 7. However, the valve poppet 3 of the low-pressure valve part 16 can be urged to close by means of the actuator 2 when an appropriate signal is commanded by the control unit 8. Once the valve poppet 3 sits on the valve seat 4, pressure is built up inside the working chamber 15 and therefore the remaining fraction of the fluid within the working chamber 15 will be ejected through the high-pressure valve part 17 towards the high-pressure fluid reservoir 12.

Once the top dead centre of the piston 53 is passed, the fluid ejection ends and fluid is again inputted through the low-pressure valve part 16.

Since the closing command to the actuator 2 can be effectuated at essentially any position of the piston 53, a variable fraction of the maximum volume of the working chamber 15 can be "effectively pumped" towards the high-pressure fluid reservoir 12.

If the low-pressure valve part 16 remains open during the whole contraction cycle, no pumping is performed. If the low-pressure valve part 16 is closed right at the bottom dead centre of the piston 53, the whole volume is pumped, thus resembling a "classical fluid pump". And if the low-pressure valve part 16 is closed somewhere between the bottom dead centre and the top dead centre of the piston 53, a part-stroke pumping cycle is performed.

It is clear to the person skilled in the art that the presently description of the invention is only illustrative and not limiting in any way. In particular modifications of the presently shown embodiments are possible, of course.

The invention claimed is:
1. A valve unit for a fluid working machine comprising:
a valve body, a valve closure device movably arranged in an axial direction in the valve body to open and close fluid flow to a low-pressure outlet, and at least one separate fluid flow influencing unit, wherein said fluid flow influencing unit comprises at least one fluid flow influencing part and at least one attachment means part for mechanical connection with said valve body, wherein said attachment means part and said fluid flow influencing part are connected to each other by at least one connection means part, wherein the circumferential extent of said attachment means part is the same as the circumferential extent of said connection means part, wherein the valve closure device is located between the fluid influencing unit and the low-pressure outlet such that the fluid flow influencing unit is upstream of the valve closure device, and wherein an extent of said fluid flow influencing part in a radial direction is greater than an extent of said valve closure device in the radial direction.

2. The valve unit according to claim 1, wherein the circumferential extent of said attachment means part covers large parts of a circumference.

3. The valve unit according to claim 2, wherein the mechanical connection between said at least one attachment means part and at least part of said valve body is effectuated using at least one additional fixation means.

4. The valve unit according to claim 3, wherein at least one attachment means part and/or said valve body comprises at least one recess part for introducing and/or for manipulating at least one additional fixation means.

5. The valve unit according to claim 3, wherein said fluid flow influencing unit is at least partially elastically deformable.

6. The valve unit according to claim 1, wherein at least one mechanical connection between at least one of said attachment means parts and at least part of said valve body is designed as a form-fitting connection.

7. The valve unit according to claim 1, wherein at least one of the at least one connection means part is designed in a fluid-flow throughput enhancing way in that at least one of the at least one connection means part is designed as a stud-like connection means and/or with a fluid-flow enhancing cross-section.

8. The valve unit according to claim 1, wherein said fluid flow influencing unit is designed and arranged in a way that it can be installed without manipulating said valve body and/or said movably arranged valve closure device.

9. The valve unit according to claim 1, wherein said at least one fluid flow influencing unit and/or at least a valve part of said valve unit is designed to be radially symmetric.

10. The valve unit according to claim 1, wherein said valve unit is of a poppet valve type.

11. The valve unit according to claim 10, wherein said at least one fluid flow influencing unit is arranged on the opposite side of the movably arranged valve closure device with respect to a valve seat, wherein said valve closure device is configured to rest on said valve seat.

12. The valve unit according to claim 1, wherein said valve unit is designed as an actuated valve unit.

13. The valve unit according to claim 12, wherein said at least one fluid flow influencing unit is designed and arranged to avoid an uncommanded actuation of the valve unit.

14. A fluid working machine comprising at least one valve unit according to claim 1.

15. The fluid working machine according to claim 14, wherein said at least one valve unit is used as a low-pressure valve unit.

16. The valve unit according to claim 1, wherein the mechanical connection between said at least one attachment means part and at least part of said valve body is effectuated using at least one additional fixation means.

17. The valve unit according to claim 1, wherein at least one attachment means part and/or said valve body comprises at least one recess part for introducing and/or for manipulating at least one additional fixation means.

18. The valve unit according to claim 2, wherein at least one attachment means part and/or said valve body comprises at least one recess part for introducing and/or for manipulating at least one additional fixation means.

19. The valve unit according to claim 2, wherein at least one mechanical connection between at least one of said attachment means parts and at least part of said valve body is designed as a form-fitting connection.

20. The valve unit according to claim 3, wherein at least one mechanical connection between at least one of said attachment means parts and at least part of said valve body is designed as a form-fitting connection.

21. The valve unit according to claim 1, wherein the circumferential extent is an angular dimension.

* * * * *